US008514835B2

(12) United States Patent
Duggi et al.

(10) Patent No.: US 8,514,835 B2
(45) Date of Patent: Aug. 20, 2013

(54) HIERARCHICAL MULTICAST PROTOCOL IN A MOBILE AD-HOC NETWORK

(75) Inventors: Mohan Reddy Duggi, Garland, TX (US); Niranjan, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 855 days.

(21) Appl. No.: 11/653,035

(22) Filed: Jan. 12, 2007

(65) Prior Publication Data

US 2008/0170538 A1    Jul. 17, 2008

(51) Int. Cl.
*H04J 3/24*    (2006.01)

(52) U.S. Cl.
USPC .......................................... 370/349; 370/328

(58) Field of Classification Search
USPC ................. 370/254–256, 328–337, 408–410, 370/431–433; 455/422.1–460, 524–525
See application file for complete search history.

(56) References Cited

U.S. PATENT DOCUMENTS

| | | | |
|---|---|---|---|
| 6,735,448 B1* | 5/2004 | Krishnamurthy et al. | 370/318 |
| 2003/0227931 A1* | 12/2003 | Chen et al. | 370/408 |
| 2004/0157613 A1* | 8/2004 | Steer et al. | 455/446 |
| 2004/0162819 A1* | 8/2004 | Omae et al. | 707/3 |
| 2005/0180447 A1* | 8/2005 | Lim et al. | 370/432 |
| 2006/0023643 A1* | 2/2006 | Lim | 370/254 |
| 2007/0286097 A1* | 12/2007 | Davies | 370/255 |

* cited by examiner

*Primary Examiner* — Kashif Siddiqui

(57) ABSTRACT

A system, method, and computer readable medium using a hierarchical multicast protocol in a mobile ad-hoc network, comprises identifying a parent node, determining a sub-group node in communication with the parent node, determining a maximum number of host nodes in communication with the sub-group node, determining an address of the parent node based upon the determined sub-group node and the determined maximum number of host nodes, setting an address of the sub-group node based upon the determined address of the parent node, and applying a host node address to at least one of the host nodes based upon the set sub-group node address.

37 Claims, 10 Drawing Sheets

| P | 11110000 | . | 00000000 | . | 00000000 | . | 01001000 |
|---|---|---|---|---|---|---|---|
| SG1 | 11110000 | . | 00000000 | . | 00000000 | . | 01001000 |
| H1 | 11110000 | . | 00000000 | . | 00000000 | . | 01001001 |
| H2 | 11110000 | . | 00000000 | . | 00000000 | . | 01001010 |
| H3 | 11110000 | . | 00000000 | . | 00000000 | . | 01001011 |
| SG2 | 11110000 | . | 00000000 | . | 00000000 | . | 01010000 |
| H4 | 11110000 | . | 00000000 | . | 00000000 | . | 01010001 |
| H5 | 11110000 | . | 00000000 | . | 00000000 | . | 01010010 |
| SG3 | 11110000 | . | 00000000 | . | 00000000 | . | 01110000 |
| H6 | 11110000 | . | 00000000 | . | 00000000 | . | 01110001 |
| H7 | 11110000 | . | 00000000 | . | 00000000 | . | 01110010 |
| H8 | 11110000 | . | 00000000 | . | 00000000 | . | 01110011 |
| H9 | 11110000 | . | 00000000 | . | 00000000 | . | 01110100 |

HIERARCHICAL MULTICAST PROTOCOL IN A MOBILE AD-HOC NETWORK

FIELD OF THE INVENTION

The present invention is generally related to wireless networks and more specifically to using a hierarchical multicast protocol in mobile ad-hoc networks.

BACKGROUND OF THE INVENTION

Wireless networks typically follow one of two basic structures, fixed router based in which a backbone of fixed routers communicates with wireless nodes, and mobile router based in which the routers themselves are a part of the wireless node and form a self-configuring network of wireless links. In the mobile router based system, the routers are free to randomly move, leave and enter the system. Therefore, the mobile router based system links can change rapidly in both number and relative position. The links connecting nodes in a network is called a topology of the network. In an infrastructure-based system, a source wireless node communicates via a wireless link with a fixed router which in turn communicates within the infrastructure and further communicates via another wireless link to a destination wireless node. The source and destination wireless nodes communicate primarily through the fixed network topology. A mobile ad-hoc network (MANET) communicates primarily between wireless nodes, without a need for fixed routers. The topology of the MANET is self-configuring with the nodes themselves providing the routing function. The MANET does not require connection to a fixed router, but may be connected to a number of wireless networks (such as a cellular network) or to a number of data networks (such as the Internet).

The evolution and expansion of the Internet and networking has necessitated the expansion of internet protocols from IPv4 (having $4.3 \times 10^9$ addresses) to the most recent IPv6 (having $3.4 \times 10^{38}$ addresses). This expansion in Internet protocols has increased the overhead necessary to implement current MANETs since by their original design they communicated at the Internet Protocol (IP) layer. One embodiment of the present invention addresses a fundamental limitation of the original and more recent MANET architectures.

There are a number of transmission protocols including unicasting, broadcasting and multicasting. Unicasting involves the sending of data from one source to one destination node, broadcasting involves the sending of data from one source to all destination nodes, and multicasting involves the simultaneous or near-simultaneous transmission of data from one source to many destination nodes or from many sources to many destination nodes. The difference between broadcasting and multicasting is that with broadcasting, data is sent to all connected nodes while with multicasting, the data is sent to only a selected subset of all of the connected nodes. Unicasting requires that the source copy an individual data packet for each destination node allowing redundant copies of the same transmission to be sent on a link. Broadcasting a copy of the data to each node resulting in the data packet being sent along every link regardless of whether the data packet will be used at each node. Both unicasting and broadcasting protocols result in redundant or unneeded transport of data packets. Conversely, multicasting transmissions copy a data packet as close to the destination as possible, and only send the packet to addresses that are part of a multicast group. As such, bandwidth is conserved by an elimination of data transmission redundancy and unneeded transport. This aspect of multicasting is critically important in MANETs, which have limited bandwidth.

Unicasting primarily utilizes a transmission protocol referred to as Transmission Control Protocol (TCP), whereas multicasting primarily utilizes a protocol referred to as User Datagram Protocols (UDP). There are several differences between the two protocols, but a main difference stems from a guarantee of delivery whereby TCP sends a receipt acknowledgement and UDP does not. Therefore, via multicasting, large amounts of data can be sent without using bandwidth for return receipts for each data packet.

IPv4 has a 32 bit binary IP address, and IPv6 has a 128 bit binary IP address. The IPv4 IP address has four sets of 8 binary bits, referred to as octets (10001100) separated by three decimals. Using the IPv4 protocol as an example, the IP address 140.179.220.220 is shorthand for 10001100.10110011.11011100.11011100. Each of the eight binary bits can have up to 28 or 256 values, spanning from 0 to 255. Therefore, the IP addresses can theoretically span from 0.0.0.0 to 255.255.255.255.

An IPv4 IP address is comprised of two parts, a network address and a node address. The number of bits describing the network address defines the class of network and how many nodes can be utilized on that network. Of the IP address, the location of the first zero bit in the address determines the class of the network. If the first octet is less than 126, then only seven of the eight binary bits are required to describe the number which leaves the first bit as a zero. Such a scenario would indicate an existence of a class A network, represented by the following string: NNNNNNNN.nnnnnnnn.nnnnnnnn.nnnnnnnn, where the capital N's indicate the network identifier, and the lower case n's notate the node identifier. If the first octet falls between 128 and 191, then the first two binary bits describing the number are 10, with the zero falling in the second bit location indicating that the network is a class B network represented by the following string: NNNNNNNN.NNNNNNNN.nnnnnnnn.nnnnnnnn. If the first octet falls between 192 and 223, then the first three binary bits describing the number are 110, with the zero falling in the third bit location and indicating that the network is a class C network, represented by the following string: NNNNNNNN.NNNNNNNN.NNNNNNNN.nnnnnnnn. If the first octet falls between 224 and 239, then the first four binary bits describing the number are 1110, with the first zero falling in the fourth bit location and indicating that the network is a class D network represented by the following string: NNNNNNNN.NNNNNNNN.NNNNNNNN.NNNNNNNN. Class D addresses have been reserved for multicasting and include addresses ranging from 224.0.0.0 to 239.255.255.255. Multicast addresses are similar to IP addresses for individual nodes, but will not clash with node IP addresses due to the fact that the addresses are specifically reserved for multicast.

A common method of controlling network traffic is through the use of a subnet mask which allows identification of the network and node portions of the address. In a subnet mask, the network bits are represented by 1's, the node bits are represented by 0's and a bitwise AND is performed on the address. A class B address could be represented by 140.179.220.220 (10001100.10110011.11011100.11011100) and a default class B subnet mask would be 255.255.0.0 (11111111.11111111.00000000.00000000). A bitwise AND requires both compared bits to be 1's to return a result of 1, so applying the bitwise AND to the class B address would return values only where the subnet mask had a 1, in this instance 140.179.0.0 (10001100.10110011.00000000.00000000). Submasking the first four binary bits of the multicast address still allows it to be identified as a multicast ID, while allowing the remaining 28 bits to be used for addressing. In the present example, the subnet mask for the multicast address would be 240.0.0.0 (11110000.00000000.00000000.00000000) resulting in $2.6 \times 10^8$ possible multicast addresses to choose from.

MANETs are mobile networks that include nodes, such as host nodes, that can dynamically join and leave the network. It is not possible to centrally administer multicast addresses in such networks as it could be in a fixed router based system. Therefore, in such a scenario, a MANET would be required to administer itself.

SUMMARY OF THE INVENTION

A functional impasse is being approached between the capabilities of mobile ad-hoc networks in which each node acts as a router and in which low cost and low power consumption for many mobile devices necessitates lowered computational capabilities and multicasting that require increased resources. The present invention addresses this impasse by providing a hierarchical multicast protocol for mobile ad-hoc networks in which the hierarchical multicast protocol is self-administered and conserves MANET bandwidth. This hierarchical multicast routing in the MANET reduces broadcast problems that can occur when a multicast transmission is sent to the MANET, thus reducing the bandwidth requirement and the computation requirement for nodes comprising the MANET.

There are instances when certain destination nodes within a MANET are able to indicate an interest in receiving various types of information. This information can be sent from a source such as a parent or a parent group within a MANET to such destination nodes which form a sub-group within the MANET. Current multicast protocols require very high overhead for full address matching in order to provide sub-group communications.

The systems, methods, and computer readable media of the present invention provide a hierarchical approach to multicast communications within a MANET whereby the number of retransmissions that typically occur between a parent group and a sub-group during such multicast transmissions are greatly reduced. Parent group and sub-group formation and multicast IP address selection in the present invention is performed by considering at least one of: the number of parent groups, the number of sub-group levels and the maximum number of sub-group nodes per level in order to determine an optimal set or range of addresses for use in multicast transmissions. A parent group address from the available addresses is selected utilizing an auto-configuration feature and a sub-group address is formed by querying the parent groups for the most recently formed parent group and determining a sub-group address based on that query.

Multicast routing in the present invention is based on prefix matching and not on full address matching. The overhead in terms of protocol maintenance and memory required to utilize prefix matching is constant regardless of the number of sub-group nodes that are formed or serviced. As such, the overhead required for prefix matching is very low when compared to the overhead required for full address matching.

In one embodiment of the present invention, a method using a hierarchical multicast protocol in a mobile ad-hoc network, comprises identifying a parent node, determining a sub-group node in communication with the parent node, determining a maximum number of host nodes in communication with the sub-group node, determining a parent node address of the parent node based upon the determined sub-group node and the determined maximum number of host nodes, setting a sub-group node address of the sub-group node based upon the determined address of the parent node, and applying a host node address to at least one of the host nodes based upon the set sub-group node address.

In a further embodiment of the present invention, a method using a hierarchical multicast protocol in a mobile ad-hoc network, comprises requesting inclusion in a multicast group by a host node, determining a sub-group node in communication with the host node, identifying a parent node in communication with the sub-group node, recognizing a sub-group node address of the sub-group node, and applying a host node address to the host node based upon the recognized sub-group node address.

In yet a further embodiment of the present invention, a computer readable medium comprises instructions for, creating a parent node, determining a sub-group node in communication with the parent node, determining a maximum number of host nodes in communication with the sub-group node, determining a number of bits required to represent a multicast group based upon the determined sub-group node and determined maximum number of host nodes, and forecasting a parent node address of the parent node based upon the determined number of bits required to represent the multicast group.

In another embodiment of the present invention, a system using a hierarchical multicast protocol in mobile ad-hoc network, comprises a transceiver for receiving and transmitting wireless data packets, a processor communicably coupled to the transceiver, wherein the processor identifies a parent node, determines a sub-group node in communication with the parent node, determines a maximum number of host nodes in communication with the sub-group node, determines a parent node address based upon the determined sub-group node and the maximum number of host nodes, sets a sub-group node address of the sub-group node based upon the determined address of the parent node and applies a host node address to at least one of the host nodes based upon the set sub-group node address, and a memory communicably coupled to the processor, wherein the memory stores the parent node address, stores the sub-group node address and stores the host node addresses.

In yet another embodiment of the present invention, a system, comprises a module that determines a sub-group node in communication with a parent node, determines a maximum number of host nodes in communication with the sub-group node, determines an address of the parent node based upon the determined sub-group node and the determined maximum number of host nodes, sets an address of the sub-group node based upon the determined address of the parent node and applies a host node address to at least one of the host nodes based upon the set sub-group node address.

BRIEF DESCRIPTION OF THE DRAWINGS

FIG. 6 depicts a third method of hierarchical multicast protocol in mobile ad-hoc network in accordance with a preferred embodiment of the present invention;

DETAILED DESCRIPTION OF THE INVENTION

Figure 1:
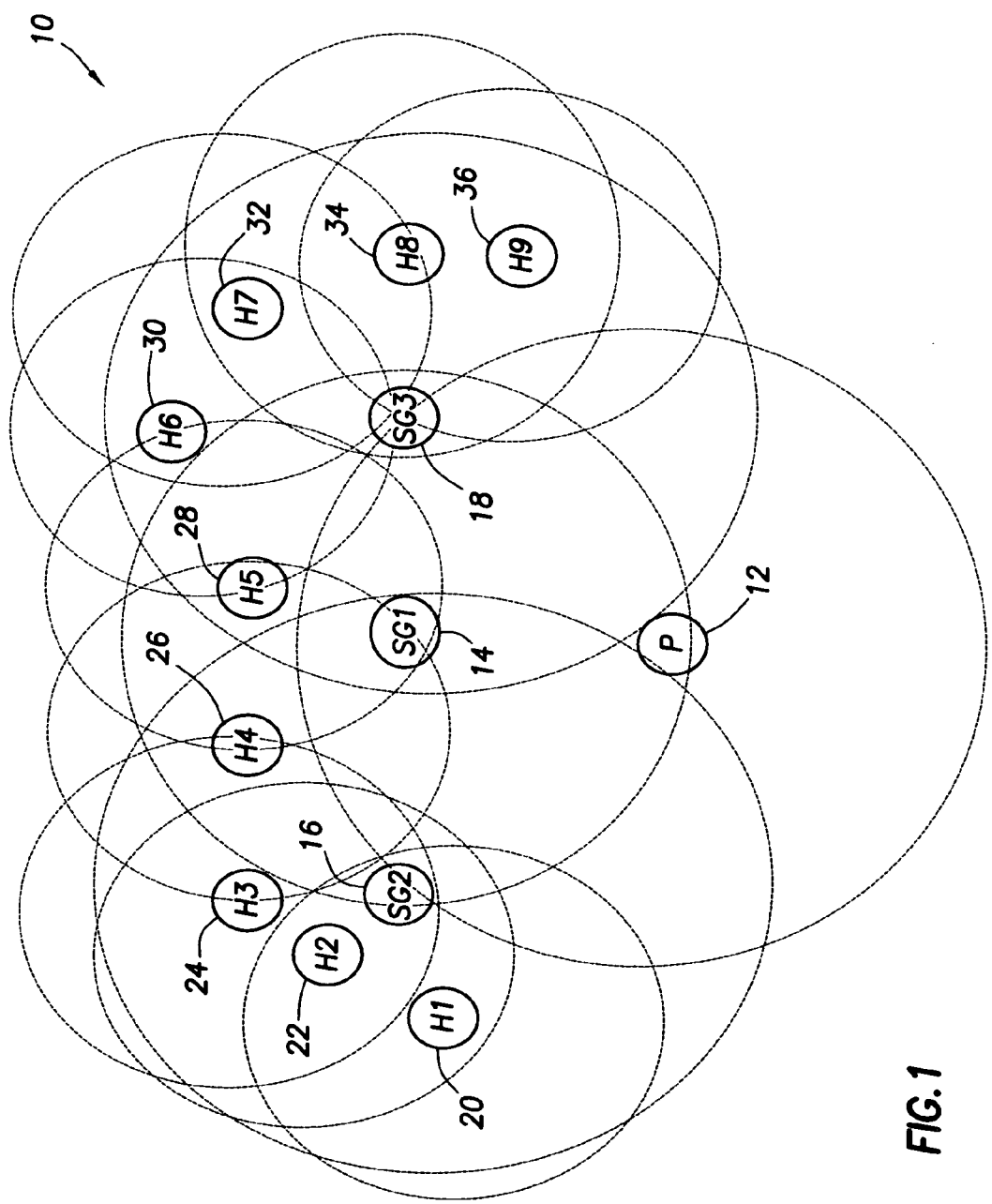
FIG. 1 depicts a mobile ad-hoc network in accordance with a preferred embodiment of the present invention.

Referring now to FIG. 1, a mobile ad-hoc network 10 is depicted and comprises a number of blocks or modules that are software, hardware, or firmware, and/or the combination of software, hardware, and/or firmware. By example only, a possible layout of 13 nodes of a MANET 10 is shown. A parent node (P1) 12 is in communication with sub-group node 1 (SG1) 14, sub-group node 2 (SG2) 16 and sub-group node 3 (SG3) 18. Sub-group node 1 is in communication with host node 1 (H1) 20, host node 2 (H2) 22 and host node 3 (H3) 24. Sub-group node 2 is in communication with host node 4 (H4) 26 and host node 5 (H5) 28. Sub-group node 3 is in communication with host node 6 (H6) 30, host node 7 (H7) 32, host node 8 (H8) 34 and host node 9 (H9) 36. The overlapping circles represent links between the various nodes. A manual setup of addresses in a MANET for purposes of multicasting are not feasible. Therefore, a system or methodology of self-configuration is needed. The present invention addresses this self-configuration need.

Figures 2, 3:
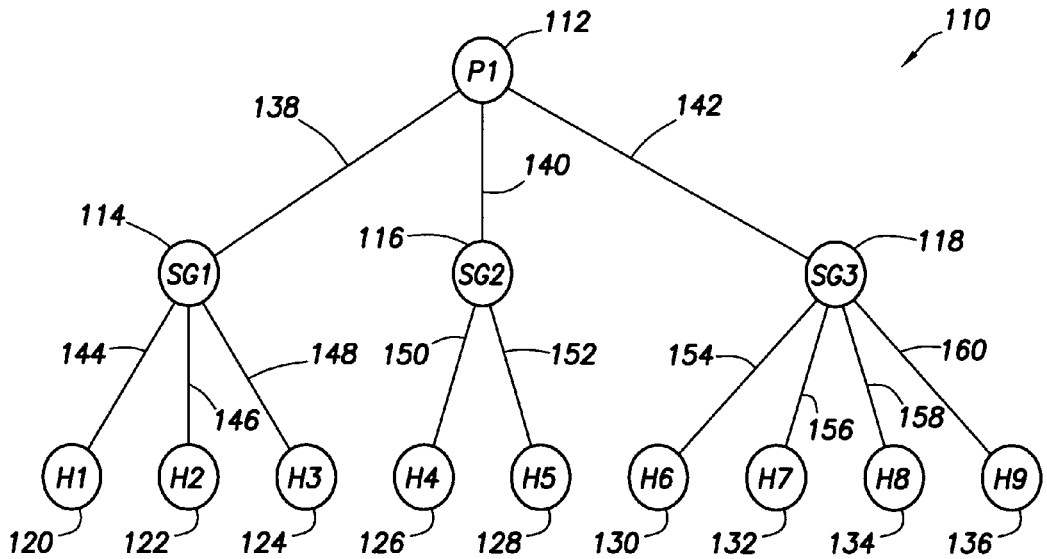
FIG. 2 depicts a parent group and sub-group of the mobile ad-hoc network in accordance with a preferred embodiment of the present invention.
FIG. 3 depicts a hierarchical mobile ad-hoc network multicast routing table in accordance with a preferred embodiment of the present invention.

Referring now to FIG. 2, a mobile router diagram 110 of the mobile ad-hoc network 10 is depicted and comprises a number of blocks or modules that are software, hardware, or firmware, and/or the combination of software, hardware, and/or firmware. The present example is a hierarchical layout of the physical layout depicted in FIG. 1. Similarly to FIG. 1, a parent node (P1) 112 is in communication with sub-group node 1 (SG1) 114, sub-group node 2 (SG2) 116 and sub-group node 3 (SG3) 118. Sub-group node 1 is in communication with host node 1 (H1) 120, host node 2 (H2) 122 and host node 3 (H3) 124. Sub-group node 2 is in communication with host node 4 (H4) 126 and host node 5 (H5) 128. Sub-group node 3 is in communication with host node 6 (H6) 130, host node 7 (H7) 132, host node 8 (H8) 134 and host node 9 (H9) 136. The links between the various nodes represent communication channels that allow information to be passed from node to node. The parent node P1 communicates with SG1 by way of link 138, with SG2 by way of link 140 and with SG3 by way of link 142. Sub-group node 1, SG1, communicates with host node H1 by way of link 144, with H2 by way of link 146 and with H3 by way of link 148. Sub-group node 2, SG2, communicates with host node H4 by way of link 150, and with H5 by way of link 152. Sub-group node 3, SG3, communicates with host node H6 by way of link 154, with H7 by way of link 156, with H8 by way of link 158 and with H9 by way of link 160. By communicating multicast transmissions in this manner, a minimum number of bandwidth and processor resources are required for replication and transmission.

Referring now to FIG. 3, a mobile ad-hoc network routing table 210 is depicted. The routing table 210, which may be software, hardware, or firmware, and/or the combination of software, hardware, and/or firmware, depicts identified addresses 212-236 relating to the various described nodes including the parent node address 212, the sub-group node addresses 214-218, and the host node addresses 220-236. The addresses are determined by utilizing various features as described herein.

Figure 4:
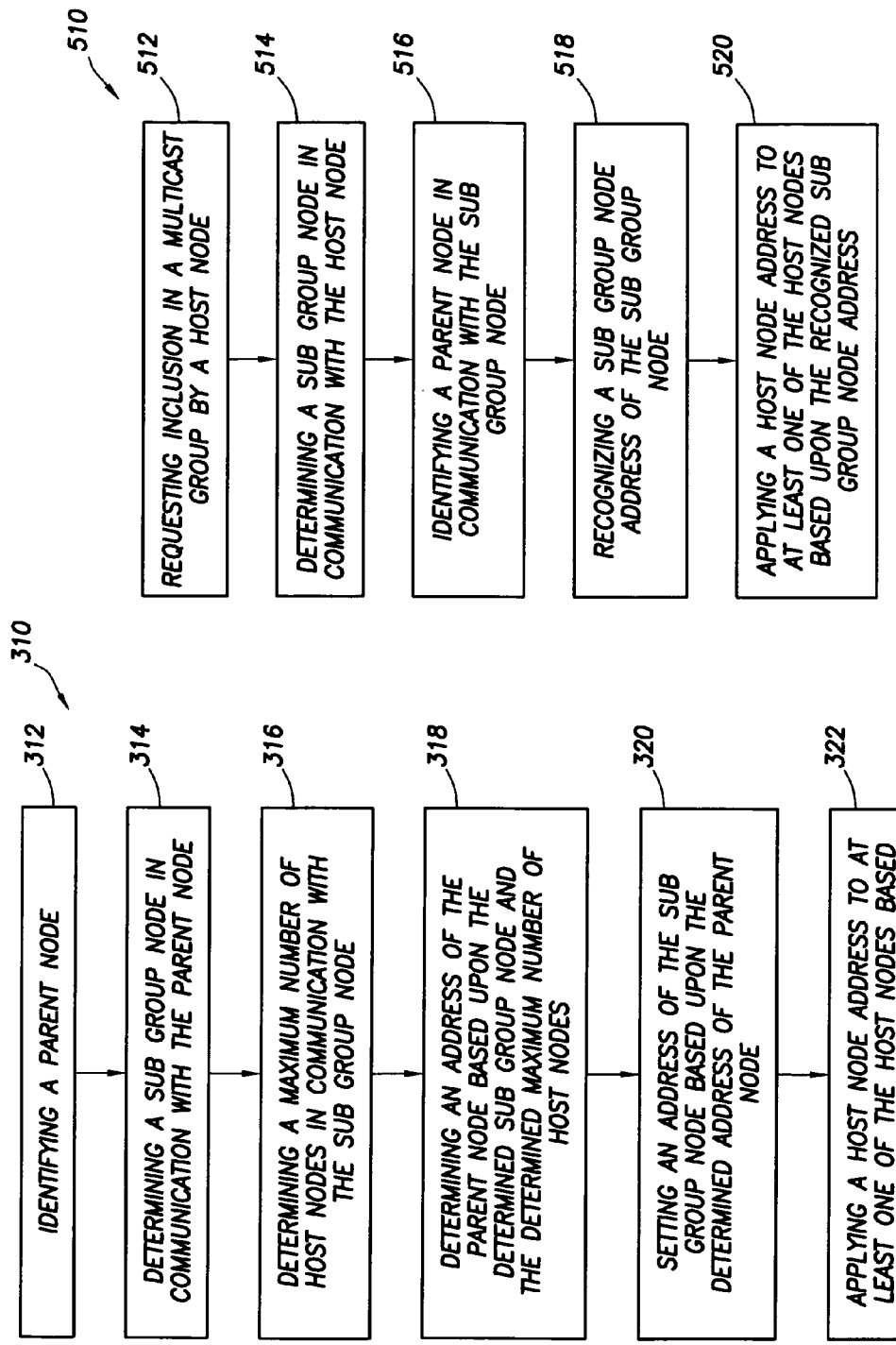
FIG. 4 depicts a first method of hierarchical multicast protocol in mobile ad-hoc network in accordance with a preferred embodiment of the present invention.

Referring now to FIG. 4, a first method 310 utilizing a hierarchical multicast protocol in a mobile ad-hoc network is depicted. The first method comprises, identifying 312 a parent node, determining 314 a sub-group node in communication with the parent node, determining 316 a maximum number of host nodes in communication with the sub-group node and determining 318 an address of the parent node based upon the determined sub-group node and the determined maximum number of host nodes. The method also comprises setting 320 an address of the sub-group node based upon the determined address of the parent node, and applying 322 a host node address to at least one of the host nodes based upon the set sub-group node address. The method is performed by software, hardware, or firmware, and/or a combination of software, hardware, and/or firmware.

Figure 5:
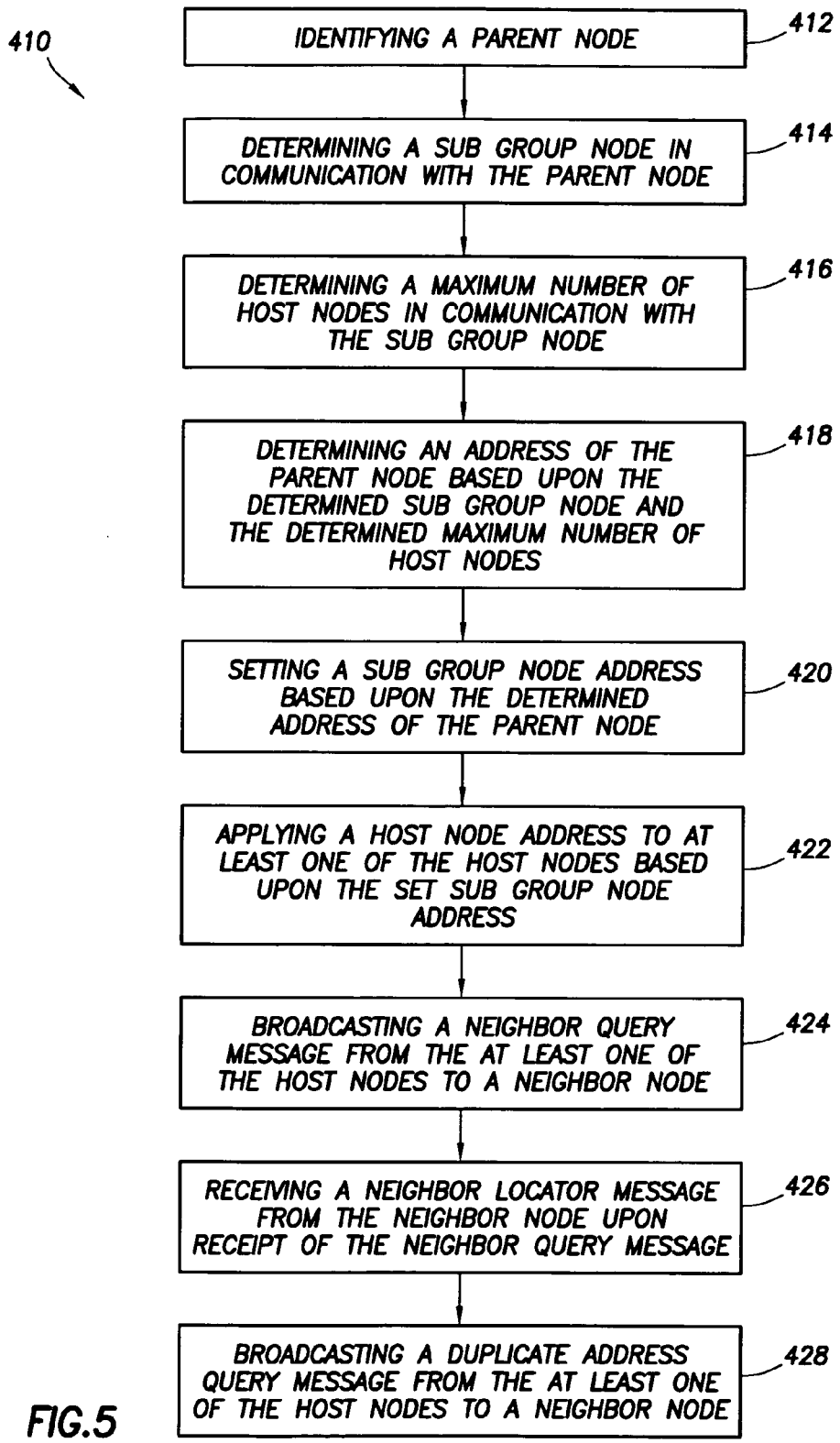
FIG. 5 depicts a second method of hierarchical multicast protocol in mobile ad-hoc network in accordance with a preferred embodiment of the present invention.

Referring now to FIG. 5, a second method 410 using a hierarchical multicast protocol in a mobile ad-hoc network is depicted. The second method comprises, identifying 412 a parent node, determining 414 a sub-group node in communication with the parent node, determining 416 a maximum number of host nodes in communication with the sub-group node and determining 418 an address of the parent node based upon the determined sub-group node and the determined maximum number of host nodes. The method also comprises setting 420 an address of the sub-group node based upon the determined address of the parent node, and applying 422 a host node address to at least one of the host nodes based upon the set sub-group node address. The method may also comprise broadcasting 424 a neighbor query message from the at least one of the host nodes to a neighbor node, receiving 426 a neighbor locator message from the neighbor node upon receipt of the neighbor query message and broadcasting 428 a duplicate address query message from the at least one of the host nodes to a neighbor node. In the present method, the identifying of the parent node is based upon at least one of: a density of the at least one of the host nodes, a speed of reception of a packet, a reliability of reception of a packet, a transmission power associated with transmission of a packet, a reception throughput of a packet, and a reception cost of a packet. The method is performed by software, hardware, or firmware, and/or a combination of software, hardware, and/or firmware.

Referring now to FIG. 6, a third method 510 using a hierarchical multicast protocol in mobile ad-hoc network is depicted. The third method comprises, requesting 512 inclusion in a multicast group by a host node, determining 514 a sub-group node in communication with the host node, identifying 516 a parent node in communication with the sub-group node, recognizing 518 a sub-group node address of the sub-group node, and applying 520 a host node address to at least one of the host nodes based upon the recognized subgroup node address. The method is performed by software, hardware, or firmware, and/or the combination of software, hardware, and/or firmware.

Figure 7:
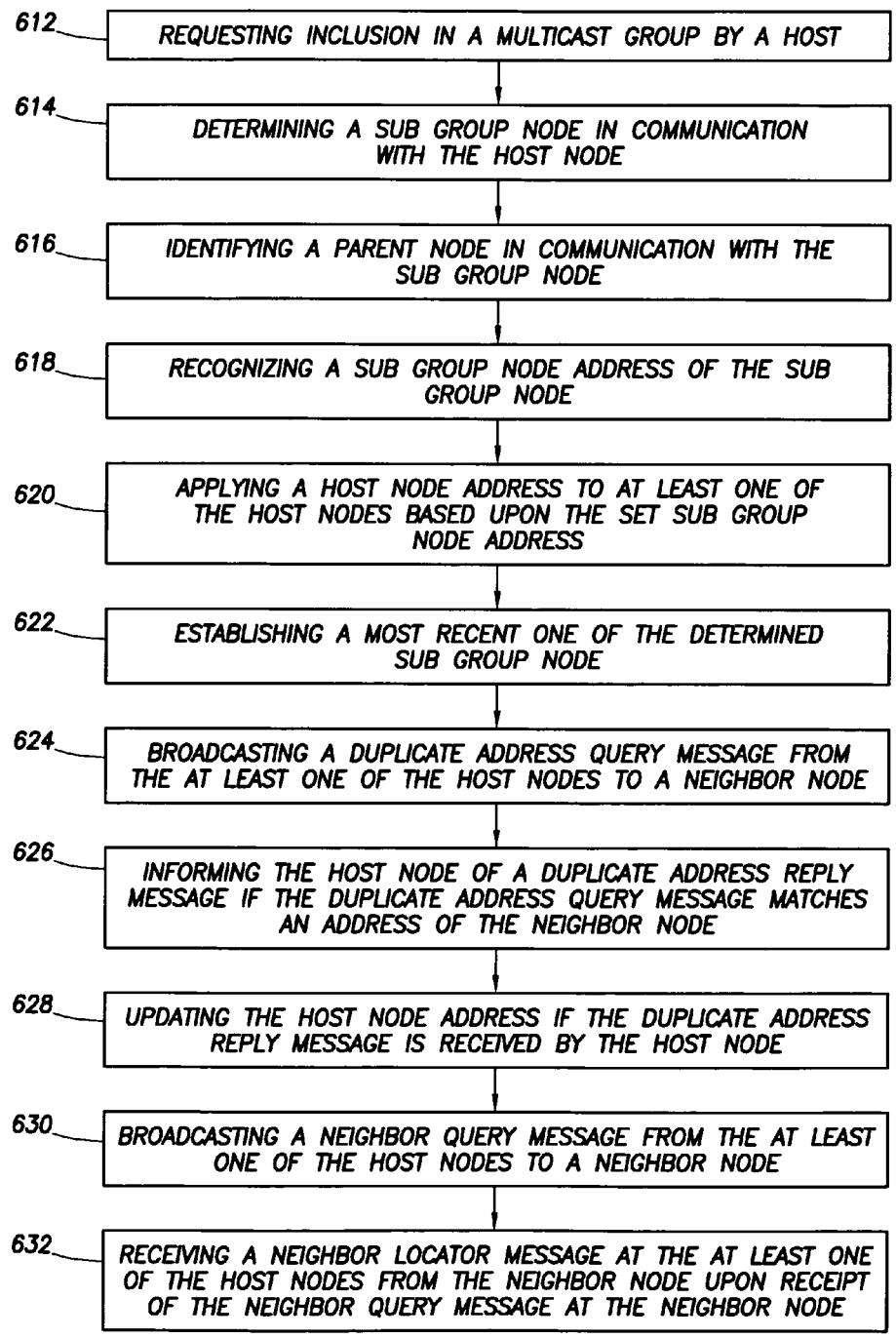
FIG. 7 depicts a fourth method of hierarchical multicast protocol in mobile ad-hoc network in accordance with a preferred embodiment of the present invention.

Referring now to FIG. 7, a fourth method 610 of hierarchical multicast protocol in mobile ad-hoc network is depicted. The fourth method comprises, requesting 612 inclusion in a multicast group by a host node, determining 614 a sub-group node in communication with the host node and identifying 616 a parent node in communication with the sub-group node. The method also comprises recognizing 618 a sub-group node address of the sub-group node, and applying 620 a host node address to at least one of the host nodes based upon the set sub-group node address. The method may also comprise establishing 622 a most recent one of the determined sub-group node, wherein the applying of the host node address is based upon the most recent one of the established sub-group node. The method may also comprise broadcasting 624 a duplicate address query message from the at least one of the host nodes to a neighbor node, informing 626 the host node of a duplicate address reply message if the duplicate address query message matches an address of the neighbor node, updating 628 the host node address if the duplicate address reply message is received by the host node, broadcasting 630 a neighbor query message from the at least one of the host nodes to a neighbor node and receiving 632 a neighbor locator message at the at least one of the host nodes from the neighbor node upon receipt of the neighbor query message at the neighbor node. The method is performed by software, hardware, or firmware, and/or the combination of software, hardware, and/or firmware.

Figure 8:
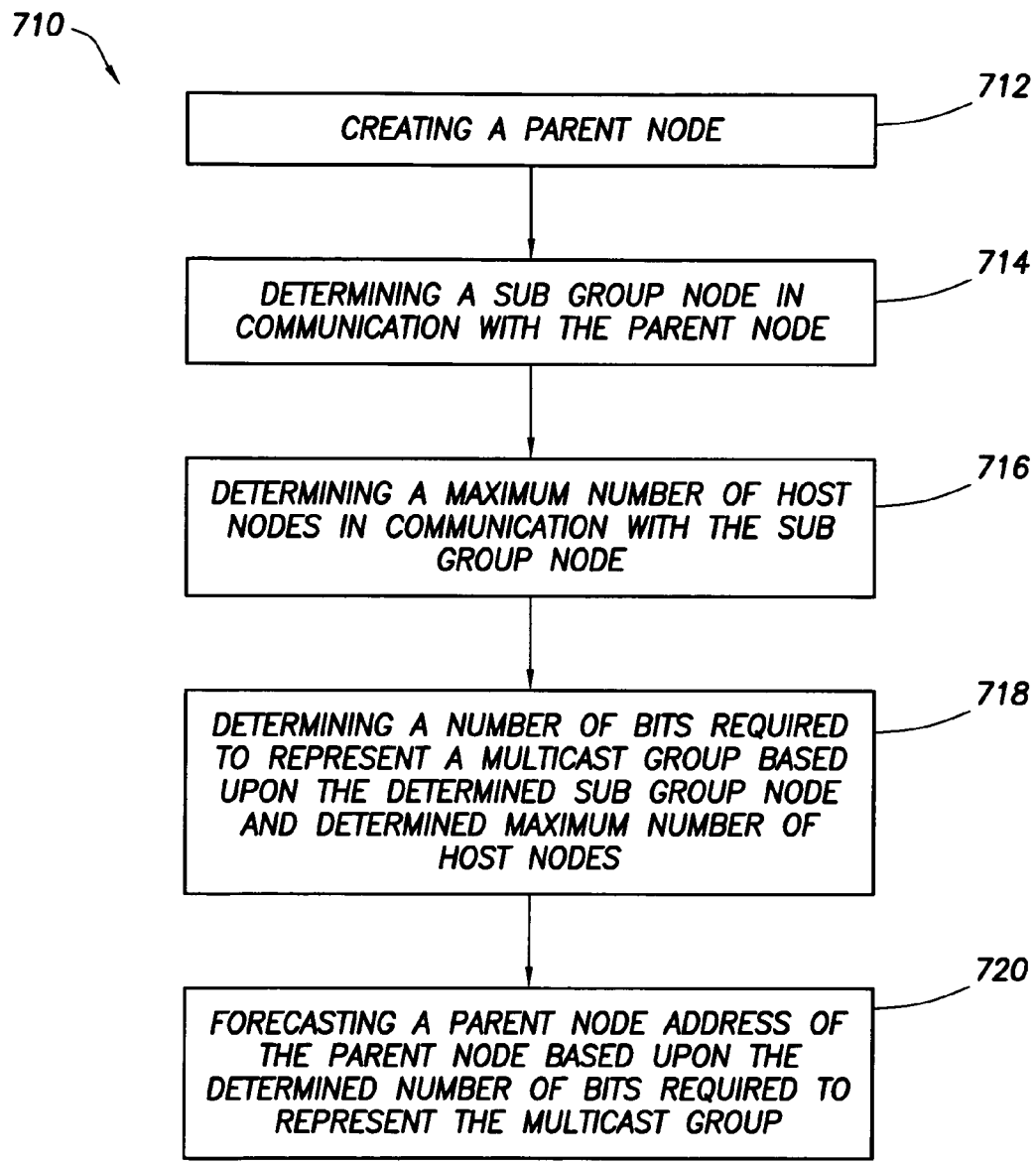
FIG. 8 depicts a first software flow diagram of hierarchical multicast protocol in mobile ad-hoc network in accordance with a preferred embodiment of the present invention.

Referring now to FIG. 8, a first software flow block 710 using a hierarchical multicast protocol in a mobile ad-hoc network is depicted. The software, or computer readable medium, comprises instructions for, creating 712 a parent node, determining 714 a sub-group node in communication with the parent node and determining 716 a maximum number of host nodes in communication with the sub-group node. The computer readable may also comprise determining 718 a number of bits required to represent a multicast group based upon the determined sub-group node and determined maximum number of host nodes, and forecasting 720 a parent node address of the parent node based upon the determined number of bits required to represent the multicast group. The steps performed in this figure are performed by software, hardware, or firmware, and/or the combination of software, hardware, and/or firmware.

Figure 9:
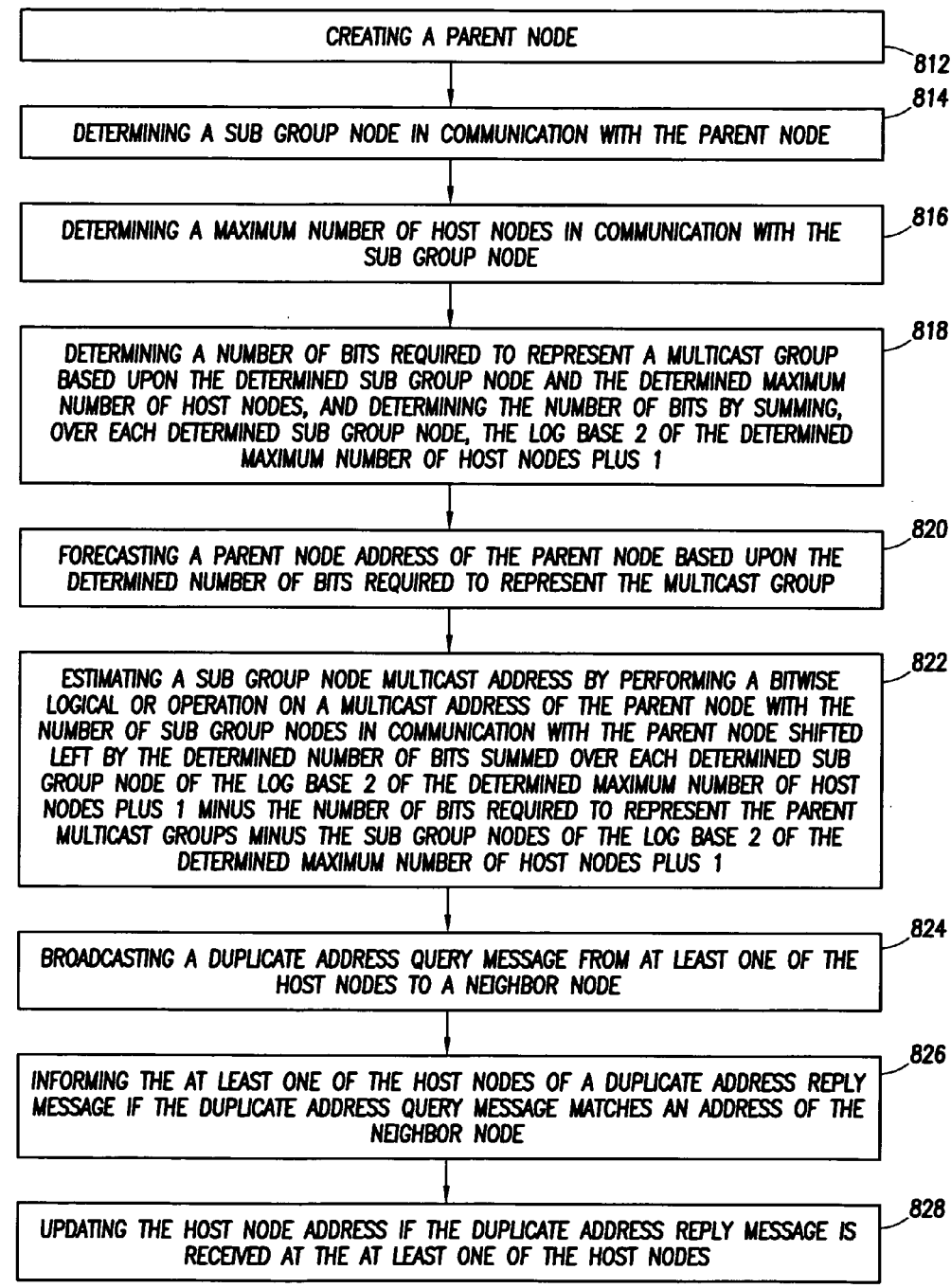
FIG. 9 depicts a second software flow diagram of hierarchical multicast protocol in mobile ad-hoc network in accordance with a preferred embodiment of the present invention.

Referring now to FIG. 9, a second software flow block 810 using a hierarchical multicast protocol in a mobile ad-hoc network is depicted. The software, or computer readable medium, comprises instructions for, creating 812 a parent node, determining 814 a sub-group node in communication with the parent node and determining 816 a maximum number of host nodes in communication with the sub-group node. The computer readable medium also comprises determining 818 a number of bits required to represent a multicast group based upon the determined sub-group node and determined maximum number of host nodes, and forecasting 820 a parent node address of the parent node based upon the determined number of bits required to represent the multicast group. The computer readable medium may also comprise determining the number of bits is the summation over each determined sub-group node of the log base 2 of the determined maximum number of host nodes plus 1, estimating 822 a sub-group node multicast address by performing bitwise logical OR operation on the parent multicast address with the number of sub-group nodes in communication with the parent group shifted left by the determined number of bits summed over each determined sub-group node of the log base 2 of the determined maximum number of host nodes plus 1 minus the number of bits required for parent multicast groups minus the sub-group nodes of the log base 2 of the determined maximum number of host nodes plus 1. The computer readable medium may also comprise broadcasting 824 a duplicate address query message from at least one of the host nodes to a neighbor node, informing 826 the at least one of the host nodes of a duplicate address reply message if the duplicate address query message matches an address of the neighbor node and updating 828 the host node address if the duplicate address reply message is received at the at least one of the host nodes. This method is preferably embodied in a computer readable medium or software but may also be embodied in firmware and is utilized via hardware. The transfer of information between the repository and the monitor occurs via at least one of a wireless protocol, a wired protocol and the combination of the wireless protocol and the wired protocol. The steps performed in this figure are performed by software, hardware, or firmware, and/or the combination of software, hardware, and/or firmware.

A group multicast address selection of the present invention is performed based on the following logic, where:
L: Number of levels of subgroup nodes
$N_1$: Maximum number of nodes in sub-group level 1
B: Number of bits required to represent the multicast group $$B = \sum_{l=1}^{L} [\text{Log}_2(n_l + 1)] \tag{1}$$

As can be seen, the number of bits required to represent the multicast group can be determined utilizing the logic (1) denoted above.

A sub-group multicast address selection of the present invention is performed based on the following logic, where:
R: Main group multicast address
$P_i$: Parent multicast group of a multicast subgroup i
$IP_i$: Multicast address of group i
$C_i$: Number of subgroups under i
$M_i$: Number of bits required for all the parents' multicast groups $$IP_i = IP_{P_i} \| (C_i << (B - M_i - B_i))$$

Where $$B_i = \text{Log}_2(n_i + 1) \tag{2}$$

As can be seen, the multicast address of group i can be determined utilizing the logic (2) denoted above.

Referring again to FIG. 3, when the address 212 of the parent node is determined, only a prefix of such an address, for example 01, is needed to communicate with the various sub-group nodes and host nodes because each of those addresses 214-236 include a matching prefix. In instances where a MANET includes a plurality of parent nodes, each additional parent node, and its respective group node addresses and host node addresses, can be characterized by a different prefix. The use of such prefixes allows data to be transmitted between the parent node and sub-group nodes, between the parent node and the host nodes, and/or between the sub-group nodes and the host nodes without the overhead required for full address matching.

Figure 10:
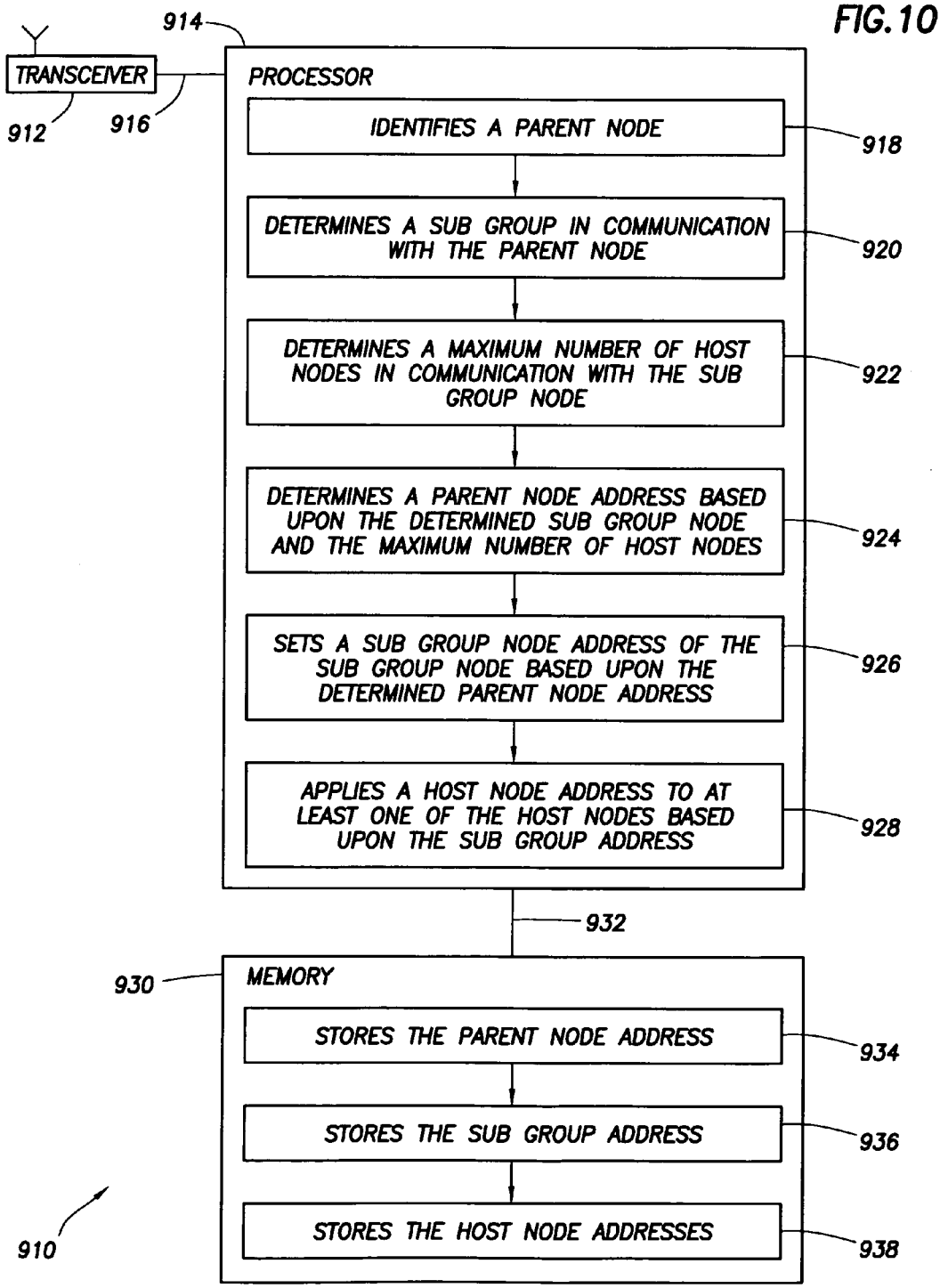
FIG. 10 depicts a first system of hierarchical multicast protocol in mobile ad-hoc network in accordance with a preferred embodiment of the present invention.

Referring now to FIG. 10, a first system 910 using a hierarchical multicast protocol in a mobile ad-hoc network is depicted. The system comprises, a transceiver 912 that receives and transmits wireless data packets, a processor 914 communicably coupled 916 to the transceiver, wherein the processor identifies 918 a parent node, determines 920 a sub-group node in communication with the parent node, determines 922 a maximum number of host nodes in communication with the sub-group node and determines 924 a parent node address based upon the determined sub-group node and the maximum number of host nodes. The processor 1014 also sets 926 a sub-group node address of the sub-group node based upon the determined address of the parent node and applies 928 a host node address to at least one of the host nodes based upon the set sub-group node address, and a memory 930 communicably coupled 932 to the processor, wherein the memory stores 934 the parent node address, stores 936 the sub-group node address and stores 938 the host node addresses. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Figure 11A:
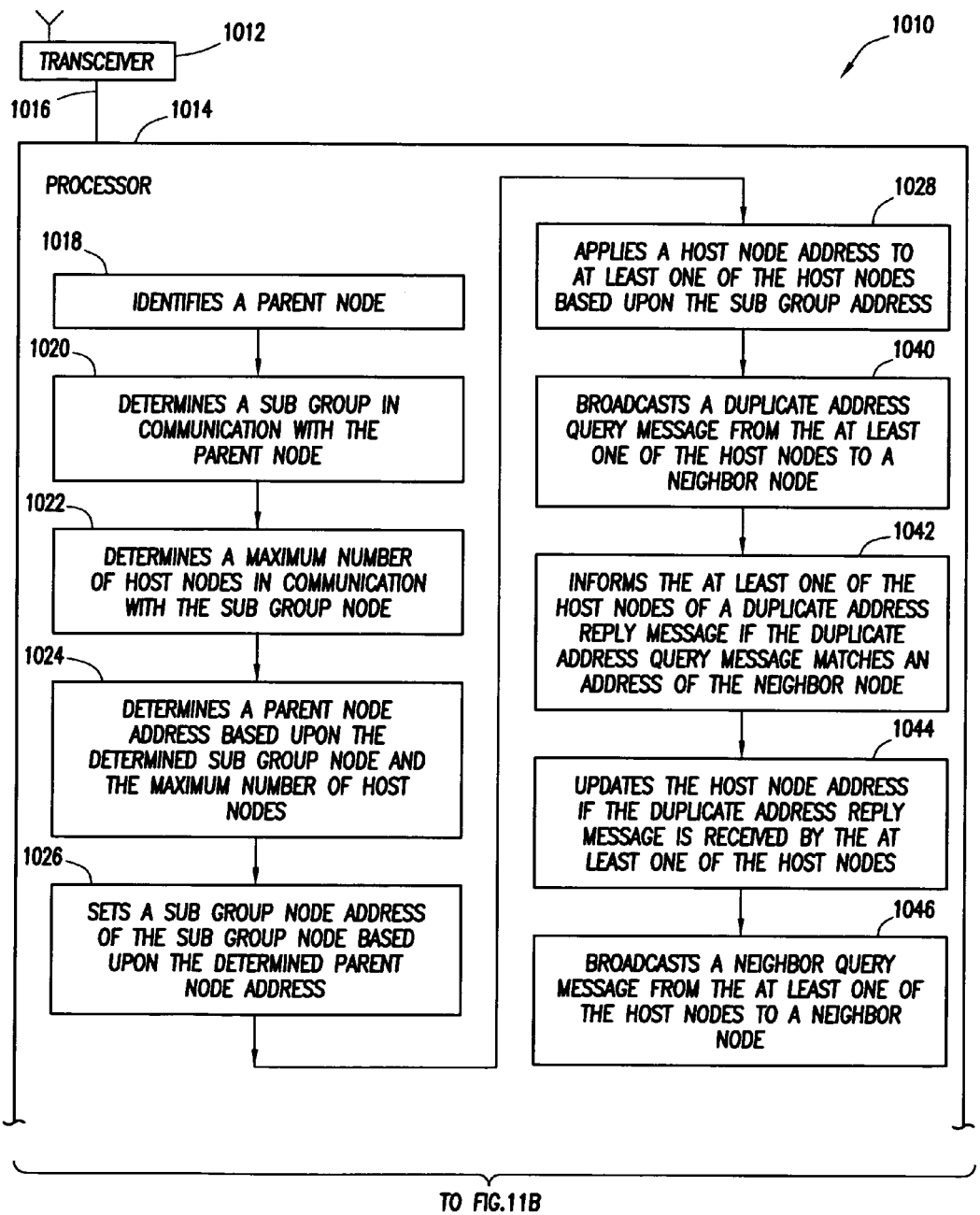
FIG. 11 depicts a second system of hierarchical multicast protocol in mobile ad-hoc network in accordance with a preferred embodiment of the present invention.
Figure 11B:
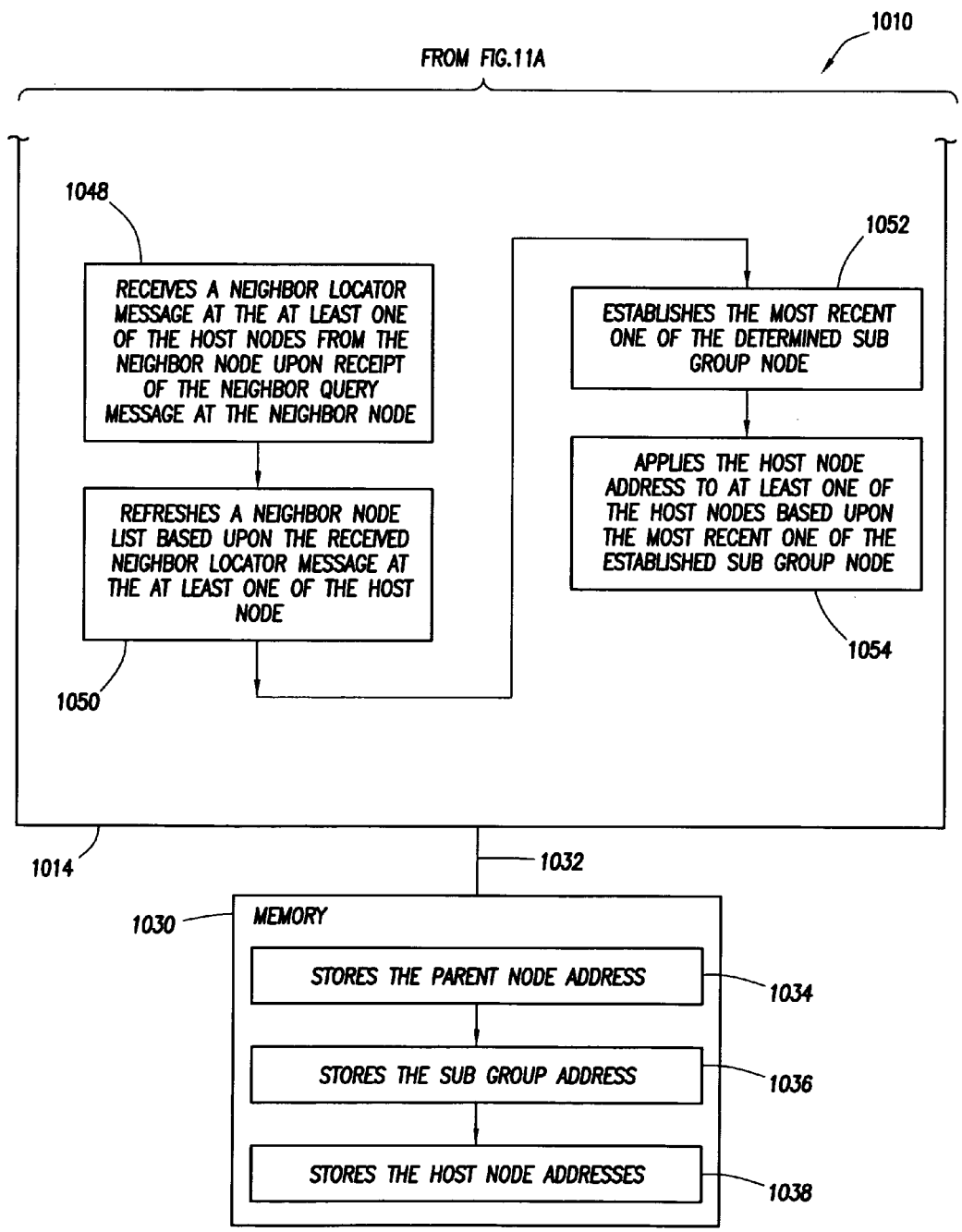

Referring now to FIG. 11, a second system 1010 using a hierarchical multicast protocol in a mobile ad-hoc network is depicted. The system comprises, a transceiver 1012 that receives and transmits wireless data packets, a processor 1014 communicably coupled 1016 to the transceiver, wherein the processor identifies 1018 a parent node, determines 1020 a sub-group node in communication with the parent node and determines 1022 a maximum number of host nodes in communication with the sub-group node. The processor 1014 also determines 1024 a parent node address based upon the determined sub-group node and the maximum number of host nodes, sets 1026 a sub-group node address of the sub-group node based upon the determined address of the parent node and applies 1028 a host node address to at least one of the host nodes based upon the set sub-group node address. The system also comprises a memory 1030 communicably coupled 1032 to the processor, wherein the memory stores 1034 the parent node address, stores 1036 the sub-group node address and stores 1038 the host node addresses. The system processor may also broadcast 1040 a duplicate address query message from the at least one of the host nodes to a neighbor node, inform 1042 the at least one of the host nodes of a duplicate address reply message if the duplicate address query message matches an address of the neighbor node, and update 1044 the host node address if the duplicate address reply message is received by the at least one of the host nodes. The processor 1014 may additionally broadcast 1046 a neighbor query message from the at least one of the host nodes to a neighbor node, receive 1048 a neighbor locator message at the at least one of the host nodes from the neighbor node upon receipt of the neighbor query message at the neighbor node and refresh 1050 a neighbor node list based upon the received neighbor locator message at the at least one of the host node. The processor may further establish 1052 the most recent one of the determined sub-group node and apply 1054 the host node address to at least one of the host nodes based upon the most recent one of the established sub-group node. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors, memories, or nodes. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. The present invention may additionally be utilized by MANETs in conjunction with various technologies including Wireless Fidelity (WiFi), ZigBee (which is the name of a specification for a suite of high level communication protocols using small, low-power digital radios in a wireless personal area network, and motes or smart dust (which may contain sensors, computing circuits, bidirectional wireless communications technology and a power supply, and when clustered together, could automatically create highly flexible, low-power networks).

What is claimed is:

1. A method using a hierarchical multicast protocol in a mobile ad-hoc network (MANET), the method comprising:
    identifying, by a node in the MANET, a parent node;
    determining, by the node, a sub-group node in communication with the parent node;
    determining, by the node, a maximum number of host nodes in communication with the sub-group node;
    determining, by the node, an address of the parent node based upon the determined sub-group node and the determined maximum number of host nodes;
    setting, by the node, an address of the sub-group node based upon the determined address of the parent node; and
    applying a host node address to at least one of the host nodes based upon the set sub-group node address,
    wherein the identifying of the parent node is based upon a transmission power associated with transmission of a packet.

2. The method of claim 1 comprising: broadcasting a neighbor query message from the at least one of the host nodes to a neighbor node.

3. The method of claim 2 comprising: receiving a neighbor locator message from the neighbor node upon receipt of the neighbor query message.

4. The method of claim 1 comprising: broadcasting a duplicate address query message from the at least one of the host nodes to a neighbor node.

5. The method of claim 1 wherein: the identifying of the parent node is further based upon the density of the at least one of the host nodes.

6. The method of claim 1 wherein: the identifying of the parent node is further based upon the speed of reception of the packet.

7. The method of claim 1 wherein: the identifying of the parent node is further based upon the reliability of reception of the packet.

8. The method of claim 1 wherein: the identifying of the parent node is further based upon the reception throughput of the packet.

9. The method of claim 1 wherein: the identifying of the parent node is further based upon the reception cost of the packet.

10. A method using a hierarchical multicast protocol in a mobile ad-hoc network, the method comprising:
   requesting inclusion in a multicast group by a host node;
   determining, by the host node, a sub-group node in communication with the host node;
   identifying, by the host node, a parent node in communication with the sub-group node;
   recognizing, by the host node, an address of the sub-group node; and
   applying, by the host node, a host node address to the host node based upon the recognized sub-group node address,
   wherein the identifying of the parent node is based upon a transmission power associated with transmission of a packet.

11. The method of claim 10 comprising: establishing a most recent one of the determined sub-group node.

12. The method of claim 11 wherein, the applying of the host node address is based upon the most recent one of the established sub-group node.

13. The method of claim 10 comprising: broadcasting a duplicate address query message from the host node to a neighbor node.

14. The method of claim 13 comprising: informing the host node of a duplicate address reply message if the duplicate address query message matches an address of the neighbor node.

15. The method of claim 14 comprising: updating the host node address if the duplicate address reply message is received by the host node.

16. The method of claim 10 comprising: broadcasting a neighbor query message from the host node to a neighbor node.

17. The method of claim 16 comprising: receiving a neighbor locator message at the host node from the neighbor node upon receipt of the neighbor query message at the neighbor node.

18. A non-transitory computer program product comprising a tangible machine-readable medium encoded with computer-executable instructions when executed cause a data processing system to perform:
   creating, by a node in a mobile ad-hoc network MANET, a parent node;
   determining, by the node, a sub-group node in communication with the parent node;
   determining, by the node, a maximum number of host nodes in communication with the sub-group node;
   determining, by the node, a number of bits required to represent a multicast group based upon the determined sub-group node and the determined maximum number of host nodes; and
   forecasting, by the node, a parent node address of the parent node based upon the determined number of bits required to represent the multicast group,
   wherein the parent node is configured to be identified based upon a transmission power associated with transmission of a packet.

19. The computer program product of claim 18 comprising instructions for: determining the number of bits by summing, over each determined sub-group node, the log base 2 of the determined maximum number of host nodes plus 1.

20. The computer program product of claim 19 comprising instructions for: estimating a multicast address of the sub-group node by performing a bitwise logical OR operation on a multicast address of the parent node.

21. The computer program product of claim 20 comprising instructions for: shifting left a number of sub-group nodes in communication with the parent node.

22. The computer program product of claim 21 comprising instructions for: shifting left the number of sub-group nodes in communication with the parent node by the determined number of bits summed over each of the sub-group nodes of the log base 2 of the determined maximum number of host nodes plus 1.

23. The computer program product of claim 22 comprising instructions for: subtracting the number of bits required to represent the multicast group.

24. The computer program product of claim 23 comprising instructions for: subtracting the sub-group nodes of the log base 2 of the determined maximum number of host nodes plus 1.

25. The computer program product of claim 18 comprising instructions for: broadcasting a duplicate address query message from at least one of the host nodes to a neighbor node.

26. The computer program product of claim 25 comprising instructions for: informing the at least one of the host nodes of a duplicate address reply message if the duplicate address query message matches an address of the neighbor node.

27. The computer program product of claim 26 comprising instructions for: updating the host node address if the duplicate address reply message is received at the at least one of the host nodes.

28. A system in a mobile ad-hoc network, the system comprising:
   a transceiver configured to transmit and receive wireless data packets;
   a processor communicably coupled to the transceiver, wherein the processor is configured to identify a parent node, determine a sub-group node in communication with the parent node, determine a maximum number of host nodes in communication with the sub-group node, determine an address of the parent node based upon the determined sub-group node and the determined maximum number of host nodes, set a sub-group node address of the sub-group node based upon the determined address of the parent node and apply a host node address to at least one of the host nodes based upon the set sub-group node address, wherein the processor is configured to identify the parent node based upon a transmission power associated with transmission of a packet; and
   a memory communicably coupled to the processor, wherein the memory is configured to store the parent node address, store the sub-group node address and store the host node addresses.

29. The system of claim 28, wherein the processor is configured to:
   broadcast a duplicate address query message from the at least one of the host nodes to a neighbor node;
   inform the at least one of the host nodes of a duplicate address reply message if the duplicate address query message matches an address of the neighbor node; and
   update the host node address if the duplicate address reply message is received by the at least one of the host nodes.

30. The system of claim 29, wherein the processor is configured to:
   broadcast a neighbor query message from the at least one of the host nodes to a neighbor node; and receive a neighbor locator message at the at least one of the host nodes from the neighbor node upon receipt of the neighbor query message at the neighbor node.

31. The system of claim 30, wherein the processor is configured to refresh a neighbor node list based upon the received neighbor locator message at the at least one of the host node.

32. The system of claim 31, wherein the processor is configured to establish the most recent one of the determined sub-group node.

33. The system of claim 32, wherein the processor is configured to apply the host node address to at least one of the host nodes based upon the most recent one of the established sub-group node.

34. A system comprising:
a module configured to determine a sub-group node in communication with a parent node, determine a maximum number of host nodes in communication with the sub-group node, determine an address of the parent node based upon the determined sub-group node and the determined maximum number of host nodes, set an address of the sub-group node based upon the determined address of the parent node and apply a host node address to at least one of the host nodes based upon the set sub-group node address, wherein the module is configured to determine the address of the parent node based upon a transmission power associated with transmission of a packet.

35. The system of claim 34, wherein at least one node is configured to utilize a prefix of the determined address of the parent node to communicate between the parent node and the sub-group node.

36. The system of claim 35, wherein the at least one node is configured to utilize the prefix of the determined address of the parent node to communicate between the parent node and the host nodes.

37. The system of claim 35, wherein the at least one node is configured to utilize the prefix of the determined address of the parent node to communicate between the sub-group node and the host nodes.

* * * * *